United States Patent [19]
Valente

[11] 3,782,736
[45] Jan. 1, 1974

[54] SCRAPER RINGS
[75] Inventor: Peter Reginald Valente, Ealing, England
[73] Assignee: Hallite Holdings Limited, Hampton, Middlesex, England
[22] Filed: Dec. 7, 1971
[21] Appl. No.: 205,646

[30] Foreign Application Priority Data
Dec. 10, 1970 Great Britain.................. 58,778/70

[52] U.S. Cl.................... 277/24, 277/205, 15/256.5
[51] Int. Cl............................................. F16j 15/32
[58] Field of Search...................... 277/182, 24, 205, 277/168; 15/256.5, 210 B

[56] References Cited
UNITED STATES PATENTS
2,907,596  10/1959  Maha................................. 277/205
2,893,770  7/1959  Poncet............................. 277/182
3,601,419  8/1971  Fern.................................. 277/205

Primary Examiner—Samuel B. Rothberg
Attorney—Larson et al.

[57] ABSTRACT

A scraper ring has a scraping edge on a frusto-conical scraper member extending in one axial direction and an annular channel body, the mouth of the channel opening in the opposite axial direction. The material is a hard but firmly resilient plastics material such as nylon. The scraper member joins the channel at its essentially planar base so that the scraper member and radially inner side wall of the channel are continuous. The scraper ring is preferably received in the chamber of a one-piece housing which is radially oversize so that the ring may float radially, being axially retained by an overhang in the wall of the housing. It is fitted by being forced through a restricted mouth opening of the housing.

9 Claims, 7 Drawing Figures

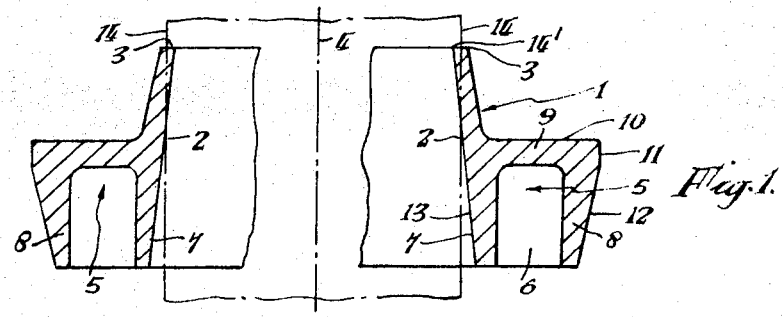
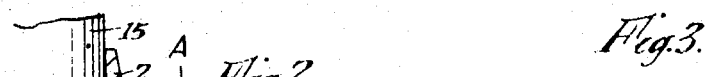
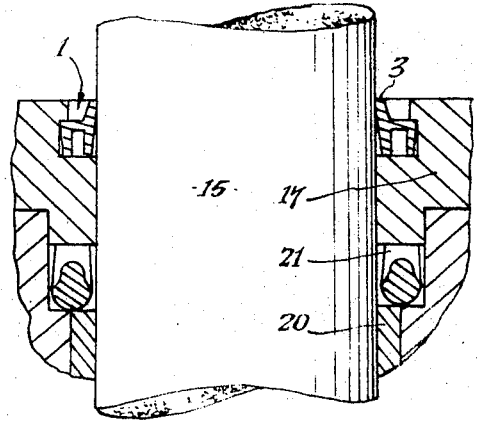
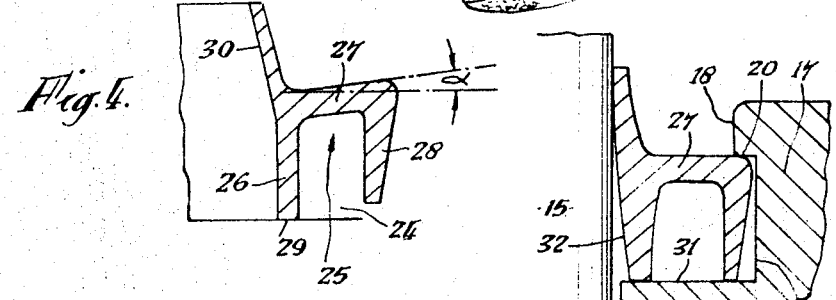
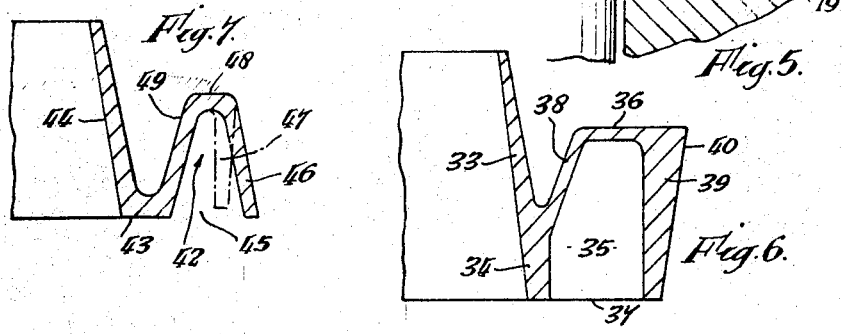
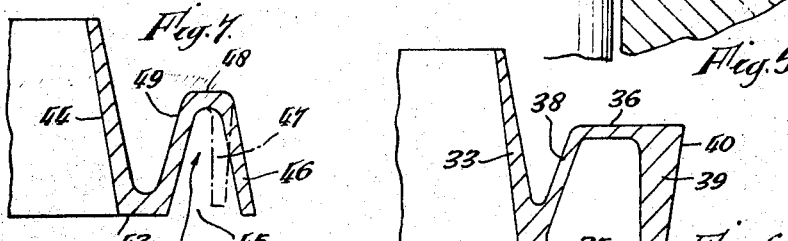

SCRAPER RINGS

FIELD OF THE INVENTION

This invention relates to scraper rings.

BACKGROUND OF THE INVENTION

Scraper rings, which are designed to prevent the entry of dirt into equipment along a moving shaft, present a scraping edge to the shaft which is pressed firmly against it. The rings are subjected to hard wear and it is desirable to replace them easily. To this end it has been the practice to make up the housing which receives them around the shaft in two parts, one being a detachable cover which can retain the scraper in place until it is itself removed. It is desirable however that the housing should be in one piece even if this means that a worn ring has to be destroyed to be removed, and it is an object of the invention to provide a ring which can be used in a one piece housing (although of course it can also be used in two-piece housings).

Previous attempts to solve this problem have concentrated on using what is in effect an adaptation of a channel ring; see, for example, U K Patent No. 1,008,657.

The scraping edge is presented by a scraper member which is the frusto-conically extended wall of a channel which opens in the same direction as the member extends. The ring is retained in its housing by the free edge of the other wall of the channel latching under an overhang.

SUMMARY OF THE INVENTION

In contrast, the present invention provides a ring when the scraper member is connected to an annular channel which opens in the direction opposite to that in which the scraper member extends. This means that it is the radially outer edge of the base of the channel which engages the overhang. This is a portion of the ring of considerable strength, enabling a firm and secure connection to be made.

According to the invention there is provided a scraper ring which has a frusto-conical scraper member with a free scraping edge at its smallest diameter, and the scraping member being joined to an annular channel portion of the ring which channel opens away from the free scraping edge. The annular channel portion may be joined directly to the scraper member by its base so that the scraper member is a continuation of the radially inner wall of the channel. In this case, the radially innermost surfaces of the scraper member and of the inner wall may lie on a single cone or alternatively the radially innermost surface of the scraper member may be on a cone and the radially inner surface of the radially inner wall of the channel may be on a cylinder. In another form, the scraper member may join with one wall (namely the radially inner wall) of the channel portion between the base of the channel and the free edge of the wall of the channel, the base of the channel being linked to that level by a frusto-conical annulus. In another form of the invention the channel is linked to the scraping member at the level of the mouth of the channel so that the scraper member occupies the whole of the axial length of the scraper ring.

In another aspect of the invention there is provided apparatus having a scraper ring situated in a housing surrounding a shaft, a scraper member decreasing conically in internal diameter in one axial direction with a scraper edge firmly engaging the shaft, the scraper ring having an annular channel portion which opens in the axial direction away from that in wich the scraper member decreases, the channel having a base which is engaged by an overhanging portion of the housing to retain the scraper ring axially within the housing. Preferably the housing is a one-piece housing having a restricted mouth and a chamber, the transition between the mouth and the chamber being in the form of an undercut, the outermost diameter of the ring being dimensioned so that the ring may be pushed through the mouth portion of the housing under compression but without damage by applying pressure axially to it, to push the open mouth of the channel portion of the ring first through the restricted mouth of the housing so that the base of the channel can engage under the ledge. In such a ring a radially outer surface of the channel is preferably given a conicity in an axial direction opposite to the direction of conicity of the scraper member so that it provides a lead-in for the ring as it is pressed into the restricted mouth.

Particular embodiments of the invention are described with reference to the accompanying drawings wherein:

FIG. 1 is a diametrical sectional elevation of a first embodiment of the invention, FIG. 2 is a sectional elevation on one radius showing the first embodiment in the course of insertion into a housing surrounding a reciprocating shaft, FIG. 3 is a diametrical section of the first embodiment positioned in a journal for a shaft, FIG. 4 is a sectional elevation, on one radius, of a second embodiment of ring, FIG. 5 is a similar section to FIG. 4 showing the embodiment of FIG. 4 in position in a housing, FIG. 6 is a sectional elevation, on one radius, of a third embodiment of ring, and FIG. 7 is a sectional elevation, on one radius, of a fourth embodiment of ring.

The embodiment shown in FIG. 1 is a scraper ring 1 which has a scraper member 2 which is frusto-conical in form and which presents a free scraping edge 3 at its least diameter, measured across a central axis 4 of the ring. The apex of the cone of which the scraper member 2 is part is upwardly in the drawing. The scraper member 2 also tapers in its own thickness towards its free edge 3. The ring also has a channel 5 of which the mouth 6 opens away from the free scraping edge 3 i.e. in the axial direction opposite to that in which the free edge 3 is presented. The channel has a cylindrical radially inner side wall 7 and cylindrical radially outer side wall 8 and a base 9 which joins the two and is in the form of a flat annulus of which the surface 10, which is outside the channel and away from the mouth 6, is planar. The radially outermost surface of the wall 8 is made up of two portions, a cylindrical portion 11 and a frusto-conical tapering portion 12 of which the conicity is directed oppositely to that of the scraper member 2.

The radially inner wall 7 has a radially innermost surface 13 which in this embodiment is continuous with the radially inner surface of scraper member 2. That is to say the scraper member 2 joins the channel 5 at the base 9 of the channel and with the channel provides a single frusto-conical radially innermost surface for the ring.

This embodiment is intended to fit around a shaft having the nominal diameter indicated by the dot dash line 14, FIG. 1, which is greater than the unstressed minimum diameter 14' of the scraper edge 3, so that the edge will be pressed into contact with any such shaft around which the ring 1 is placed.

The situation that arises when the ring is being placed in a housing around the shaft 15 is shown in FIG. 2. The shaft 15 has an outer diameter 14 and the free scraper edge 3 of scraper member 2 is forced by that somewhat radially outwards. A one-piece housing 16 surrounds the shaft in a journal part 17 for the shaft and consists of a mouth portion 18 and a chamber 19 of a larger diameter than the mouth, with a sharp undercut transition between them which is a planar ledge 20.

The size of the cylindrical part 11 of the ring is such that when the ring is being pressed into the housing, FIG. 2, it can just be forced through the restricted mouth, without damage to the ring, this forcing being assisted by the lead-in offered by the surface 12 of the ring and by the slight inherent resilience of the disc 10 and the conical scraper member 2. The ring is intended to be of an essentially hard material such as Nylon, Delrin or Miranyl, but in any such material there is a certain amount of resilience and it is this which is used to allow the ring to be forced into a housing such as that shown in FIG. 2 and then to be firmly retained by the interengagement of the ledge 20 and the outermost part of the surface 10 once the channel portion of the ring is in the chamber portion 19 of the housing. This slight expansion out relieves to a certain extent pressure being exerted by the scraper member on the shaft but as noted in FIG. 1 its natural minimum diameter 14' is less than the diameter 14 of the shaft and it will at all times be pressed against the shaft by virtue of its conicity.

It is of course possible to use this ring with a two-part housing but then advantages of such a ring would not be fully exploited.

It is preferred that the greatest diameter of the ring (in this embodiment the diameter of the cylindrical surface 11) shall be less than the diameter of the chamber 19 so that the ring is at all times free to float radially in the chamber so taking up any slight radial eccentricity or float in the shaft, without damage to the ring.

FIG. 3 shows a typical shaft assembly, for example of a hydraulic ram, with a journal part 19, a scraper ring 1 in position in a housing on an axially outer face of the journal, and with bearing 20 and a sealing ring 21 being positioned to face internally towards, for example, the hydraulic chamber from which the ram shaft 15 projects. The scraper edge 3 of the ring 1 under pressure against the shaft 15 prevents the entry into the journal or to the sealing ring 21 of dirt or moisture as the shaft moves in reciprocation.

A second embodiment of ring is shown in FIG. 4 where the channel, here given the reference 25 has a radially inner wall 26 of which both inner and outer surfaces are cylindrical. The mouth of the channel is at 24. The base of the channel 27 is not exactly planar and is a slightly dished annulus, the angle $\alpha$ of its conicity being low (a matter of 2 or 3 degrees). The radially outer wall 28 does not attain the same plane as the free edge 29 of the inner wall, by an amount approximately equal to the amount by which the radially outer edge of the base 27 is displaced (along the axis of the ring) from the plane of its radially inner edge.

In this embodiment there is no single conical surface at the radially innermost surface of the ring, since the radially innermost surface of the wall 26 is cylindrical and the radially innermost surface 30 of the scraper member is conical, the two surfaces meeting at a line approximately level with the base of the channel 27.

When this ring is placed into position in the housing, as shown in FIG. 5, it is arranged that the axial length between the ledge 20 and the innermost end 31 of the housing shall be the length of the inner wall 26 of the ring so that, in order to engage the base 27 under the ledge 20, the base must be brought to planarity. In this way the ring is tightly axially held in the housing and the effect of any inaccuracy in manufacture in the axial measurements of the ring or housing, is minimised. Also the effect of this is slight to distort the inner wall 26 so that it is bowed somewhat inwardly towards the shaft as indicated somewhat exaggeratedly at 32 in FIG. 5.

When the ring is to be of small diameter or of extra hard material it may be necessary to allow for increased radial elasticity of the ring. The embodiments shown in FIGS. 6 and 7 do this in varying degrees.

The embodiment in FIG. 6 has a scraper member 33 which joins the radially inner wall 34 of the channel 35 between the level 36 of the base of the channel and the level of its mouth 37, being joined to a planar annulus which forms the base of the channel by a frusto-conical annulus 38. Preferably the cone angles of the annulus 38 and of the scraper member 33 are equal. The radially outer wall 39 of the channel has a radially outermost surface 40 which is conical, in the axial direction opposite to the conicity of the scraper member 33, over all of its axial length. The operation of this embodiment is similar to those described previously, the presence of frusto-conical annuluar part 38 of the channel portion allowing for some increased radial elasticity during insertion into a housing.

In the embodiment of FIG. 7 where even more radial elasticity is available, a channel portion 42 is joined to the scraper member 44 at the level of its mouth 45. A ring 43 joins the radially inner wall 49 of the channel to the axial edge of the scraper member 44 remote from its scraper edge so that the scraper member extends the whole of the axial length of the ring. The angles of conicity of the scraper member 44 and radially inner wall of the channel portion are equal and opposite. The radially outer wall of the channel portion of this embodiment may be conical as shown at 46 or cylindrical, as shown in the dotted lines at 47. In use, a ledge in a housing will engage the radially outer edge of the base 48 of the channel portion.

All these rings are primarily intended to be made of a hard wear-resistant plastics material such as those mentioned by a one-piece injection moulding process.

I claim:

1. A firmly resilient unitary scraper ring having a central axis, a frusto conical scraper member of a diameter diminishing in a first axial direction, a free scraping edge at an end of the scraper member of minimum diameter, and an annular channel joined to the scraper member, the channel having an essentially planar base and a radially inner and a radially outer side wall each having a free edge, a mouth between the side walls, the radially inner side wall being continuous with the scraper member, the mouth opening in a second axial direction opposite to the said first axial direction, the free edge of the radially inner side wall having a diameter greater than that of the free scraping edge and projecting in the said second axial direction at least as far as the free edge of the radially outer side wall.

2. Scraper ring according to claim 1 wherein the radially outer wall of the channel has a radially outer surface which is the frustrum of a cone directed oppositely axially to the conicity of the scraper member, whereby at least the radially outer surface of the radially outer wall diminishes in radius toward the free edge of the said wall.

3. Scraper ring according to claim 2 wherein the radially outer wall tapers in radial thickness towards its free edge.

4. A scraper ring according to claim 1 wherein the radially inner side wall and the scraper member have radially inner surfaces which lie on a single frustrum of a cone.

5. A scraper ring according to claim 1 wherein the radially inner side wall and the scraper member have radially inner surfaces which lie at an angle to each other.

6. A scraper ring according to claim 1 wherein the base of the channel has a radially outer edge which offers a nose adapted for engagement by an overhanging ledge portion of a housing.

7. In combination a firmly resilient scraper ring, a shaft and a housing for the scraper ring, the scraper ring surrounding the shaft and being received by the housing, and axially restrained in one axial direction by a floor of the housing and in the opposite axial direction by an overhang in the housing, the scraper ring having a free scraping edge firmly engaging the shaft, the scraping edge being at one axial end of a frusto-conical scraper member of the ring, the said end being the end of least diameter of the member and also the least diameter of the ring, the scraper ring having also an annular channel portion with an essentially planar base, radially inner side wall and a radially outer side wall and an annular mouth opening between the side walls, the scraper member and the base of the channel being directly connected so that the mouth of the channel is presented in one axial direction and the scraping edge in the other, the overhang in the housing overlying and engaging the base of the channel at its radially outer portion, and at least the radially inner of the side walls of the channel engaging the floor of the housing.

8. The combination according to claim 7 wherein the housing is a one-piece housing having two integral portions, a mouth portion and a chamber portion, the mouth portion being radially narrower than the chamber portion so as to define the overhang of the chamber portion, the radial width of the mouth portion being substantially that of the channel of the scraper ring whereby the ring may be received by the housing by being forced axially through the mouth portion and then be engaged by the overhang in the chamber portion.

9. The combination of claim 8 wherein the base of the channel is an annulus dished by about 2 or 3 degrees, the side walls of the channel being of equal axial length measured from the base, and the axial length of the housing from overhang to floor is the same as the length of the legs whereby when the ring is engaged in the housing its channel is under axial compression.

* * * * *